United States Patent Office 3,553,261
Patented Jan. 5, 1971

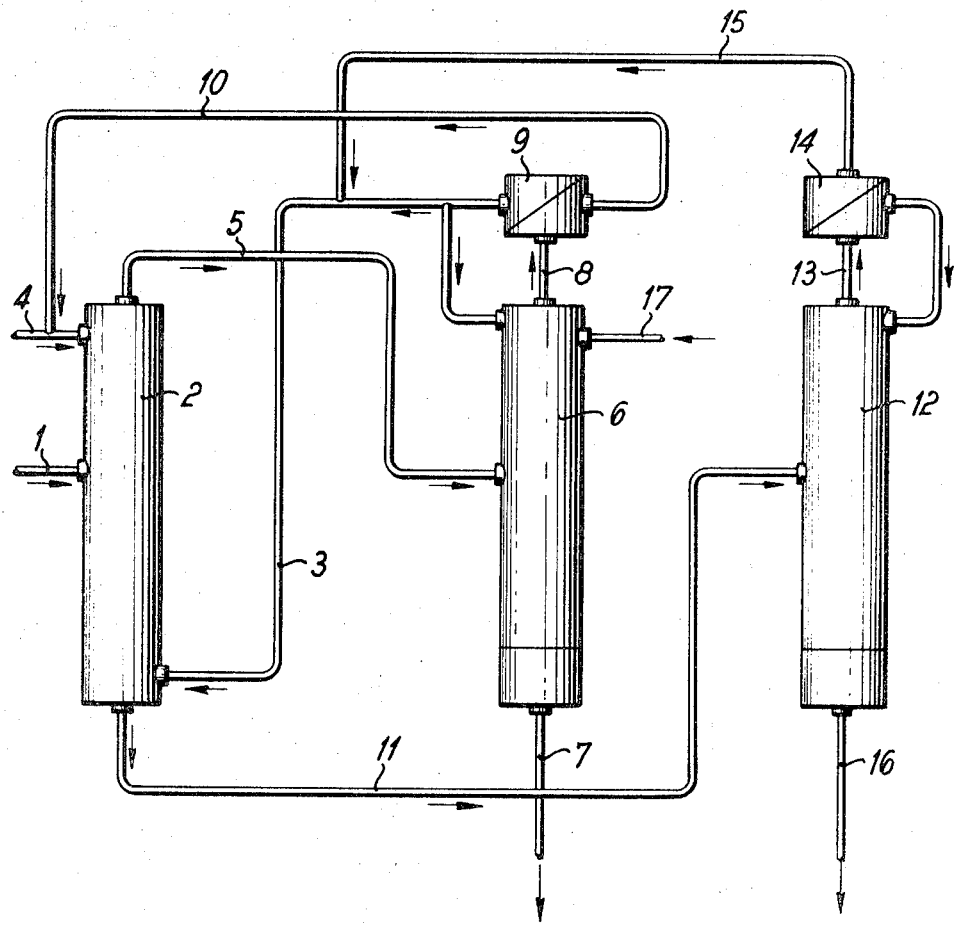

3,553,261
PROCESS FOR ISOLATING ACRYLIC ACID FROM AQUEOUS CRUDE ACID BY EXTRACTION WITH AN ESTER, WATER WASHING AND AZEOTROPIC DISTILLATION OF THE WASHED EXTRACT
Kurt Sennewald and Klaus Gehrmann, Knapsack, near Cologne, Heinz Handte, Hurth, near Cologne, Heinz Erpenbach, Surth, and Helmut Reis, Hurth, near Cologne, Germany, assignors to Knapsack Aktiengesellschaft, Kapsack, near Cologne, Germany, a corporation of Germany
Filed June 14, 1968, Ser. No. 737,212
Claims priority, application Germany, June 29, 1967, K 62,675
Int. Cl. C07c 57/04
U.S. Cl. 260—526  7 Claims

ABSTRACT OF THE DISCLOSURE

Isolation of pure acrylic acid from aqueous crude acid containing acrylic acid and in addition small proportions of acetic acid and possibly formaldehyde, by ethyl acetate extraction combined with a simultaneous water-wash of the resulting organic extract and distillative separation of the washed extract into (a) pure acrylic acid and (b) a readily boiling ethyl acetate/water-azeotrope comprising extracting the aqueous acrylic acid-containing crude acid by means of about 10 to 15 parts by weight ethyl acetate, per part by weight acrylic acid, and simultaneously washing the resulting organic extract by means of about 15 to 25 parts by weight water, per part by weight acrylic acid.

---

The present invention relates to a process for isolating acrylic acid, from aqueous crude acid by extraction with ethyl acetate, the crude acid containing acrylic acid, acetic acid and possibly small proportions of formaldehyde. The crude acids to be purified preferably include those which are obtained by the catalytic gas phase-oxidation of propylene or acrolein.

The aqueous crude acid produced by subjecting propylene to the catalytic oxidation described in German published specification 1,241,817, generally contains up to 40% by weight acrylic acid; up to 5% by weight acetic acid; and about 2% by weight formaldehyde. Various attempts have already been made with the object of isolating acrylic acid from such an aqueous solution. However, none of the processes used earlier to achieve this have been found to produce commercially satisfactory results. This is more especially the case where high yields of acrylic acid containing no more than fairly small proportions of acetic acid are desirable.

British Pat. 997,324 describes a process for isolating acrylic acid from an aqueous solution containing small proportions of acetic acid. This process comprises isolating the acrylic acid by extraction with ethyl acrylate or ethyl acetate, distilling the resulting organic extract to separate ethyl acetate and water as an overhead azeotropic fraction, given that ethyl acetate is the extractant, and recovering as the column base product a mixture of 80% by weight acrylic acid and 20% by weight acetic acid. This mixture is distilled again and extensively purified acrylic acid is obtained in the column base. The acrylic acid so produced has a strength of 96.8% and is obtained in a yield of 75% of the theoretical. In view of its high content of acrylic acid, the distillate, which is composed of 50.6% by weight acrylic acid and 49.4% by weight acetic acid, must be subjected to further purification whereby the process is rendered less economic.

A certain improvement in or relating to the above process has been described in British Pat. 997,325, the improvement comprising freeing the crude acid from acetic acid by combining the extraction step with an additional water wash. This results in acrylic acid, which has an improved purity of 99.4%. However, the yield of pure acrylic acid is as low as 54%, referred to the quantity of that acid initially contained in the crude acid. The low yield of acrylic acid is occasioned by dissolution losses of acrylic acid which occur on water-washing the extract. This means, in other words, that the acrylic acid-containing aqueous phase, which is produced during the extraction, awaits finishing treatment to recover the acrylic acid.

In French Pat. 1,405,764 it has been proposed to isolate pure acrylic acid from crude aqueous acid by extraction with diisopropyl ether or isopropyl acetate as the preferred extractants and simultaneous water-washing of the extract in countercurrent fashion. The extract subjected to finishing treatment enables a concentrate comprising 97.8% by weight acrylic acid and 2.2% by weight acetic acid to be obtained. From this acetic acid content in the purified acrylic acid concentrate, it can be inferred that this conventional purification method enables no more than about 60% by weight of the acetic acid initially contained in the crude acid to be removed therefrom. However, acrylic acid with an acetic acid content substantially of 2% by weight has been found unsuitable for either the manufacture of acrylic acid esters or use in polymerization reactions. In other words, this process fails to meet commercial standard requirements.

The disadvantages associated with these earlier processes are obviated by the present invention which enables acrylic acid to be isolated from aqueous crude acid, the isolated acrylic acid which has a purity of 99.7 to 99.8% being obtained in a yield of 98%, referred to the crude acrylic acid used.

The present process for isolating pure acrylic acid from aqueous crude acid containing acrylic acid and in addition small proportions of acetic acid and possibly formaldehyde, by ethyl acetate extraction combined with a simultaneous water-wash of the resulting organic extract and distillative separation of the washed extract into (a) pure acrylic acid and (b) a readily boiling ethyl acetate/water azeotrope comprises more especially extracting the aqueous, acrylic acid-containing crude acid by means of about 10 to 15 parts by weight ethyl acetate, per part by weight acrylic acid, and simultaneously washing the resulting organic extract by means of about 15 to 25 parts by weight water, per part by weight acrylic acid.

The ethyl acetate extraction of the crude acid and the water wash of the organic extract are preferably carried out in countercurrent fashion. A preferred feature of the present invention comprises extracting the acrylic acid-containing, aqueous crude acid by means of 11 to 13 parts by weight ethyl acetate, per part by weight acrylic acid, and washing the extract by means of 19 to 23 parts by weight water, per part by weight acrylic acid contained in the crude acid. A particularly attractive extraction effect on the acrylic acid is produced by carrying out the extracting step in a pulsation column. Polymerization of the acrylic acid during the distillative finishing treatment of the extract is obviated by the addition of a small proportion of methylene Blue polymerization inhibitor to the extract before distilling it. The economy of the present process is improved further by distillative isolation of dissolved ethyl acetate from the aqueous phase, which is obtained on extracting the crude acid, and recycling later the recovered ethyl acetate to the extraction column.

The crude acids accessible to the treatment of the present invention include those which are obtained by the catalytic gas phase-oxidation of propylene or acrolein, as already mentioned above. The aqueous crude acid can contain, for example, between about 10 and 40% by weight acrylic acid, between 1 and 8% by weight acetic acid and may contain between about 1 and 5% by weight formaldehyde.

The process of the present invention offers various advantages over the art. Thus, it is possible to isolate 99.8% acrylic acid in a yield substantially of 100% from an aqueous acrylic acid solution containing acetic acid as its principal contaminant, the isolated acrylic acid having a purity which meets all technical requirements. Despite the outstanding purity of the acrylic acid recovered, the present process is substantially easier to carry out than conventional methods, as merely one extraction column is needed for extracting the acrylic acid.

An exemplary mode of executing the process of the present invention will now be described with reference to the accompanying drawing.

Crude acid to be purified, which generally contains between 10 and 40% by weight acrylic acid, between 1 and 8% by weight acetic acid and between 1 and 5% by weight formaldehyde, is introduced through line 1 into the middle portion of pulsation column 2 having 50 perforated trays and extracted at ambient temperature by means of ethyl acetate, the ethyl acetate flowing countercurrently with respect to the crude acid and being supplied through line 3 to the base portion of pulsation column 2. The organic extract which ascends in pulsation column 2 is washed out by means of water flowing countercurrently and being supplied through line 4 to the head portion of pulsation column 2. Near the head of column 2 and through its associated line 5 there is withdrawn an extract consisting substantially of ethyl acetate, 7 to 9% by weight acrylic acid and 7 to 8% by weight water plus traces of acetic acid. The extract having a methylene Blue stabilizer added through line 17 is conveyed to the following distilling column 6, which is operated under a pressure between 150 and 250 mm. mercury and at a temperature of 95 to 110° C. Acrylic acid having a strength of 99.7 to 99.8% is obtained and withdrawn through line 7. The overhead effluent from distilling column 6 is an azeotropic ethyl acetate/water-mixture which is conveyed through line 8 to separator 9, in which it is separated into an organic phase and an aqueous phase. The organic phase comprising ethyl acetate is recycled from separator 9 through cycle line 3, and the aqueous phase is recycled through cycle line 10, into pulsation column 2. Water accumulating in the base of pulsation column 2 contains acetic acid and formaldehyde and in addition ethyl acetate in a proportion corresponding to the compound's solubility in water. To recover the ethyl acetate, the wash water is supplied through line 11 to distilling column 12 and distilled therein. The overhead effluent distillate from column 12 and line 13 is also an azeotropic ethyl acetate/water-mixture which is separated in separator 14 into two liquid layers. The upper layer comprising ethyl acetate is returned through lines 15 and 3 to the pulsation column, and the lower aqueous layer is refluxed to distilling column 12. Waste water containing acetic acid and formaldehyde, which accumulates in the base of column 12, is removed through line 16.

EXAMPLE 1

19.275 kg. aqueous crude acid, which had been stabilized with methylene Blue and contained 25.1% by weight acrylic acid, 1.3% by weight acetic acid and 1.8% by weight formaldehyde, were supplied within 75 hours to the 29th perforated tray of a perforated tray column designed as a pulsation column. The column base portion was fed with 55.950 kg. ethyl acetate, and the column head portion was fed simultaneously with 93.150 kg. water. The overhead effluent extract from the perforated tray column, consisting of 85.1% by weight ethyl acetate, 7.9% by weight acrylic acid, 7% by weight water plus traces of acetic acid and stabilizer, was concentrated in the following distilling column at a pressure of 160 mm. mercury; a column base temperature of 97° C. and a column head temperature of 33° C. 4.804 kg. of 99.8% acrylic acid, which contained 0.1% by weight acetic acid and 0.1% by weight stabilizer, were obtained. The acrylic acid yield was 99%, referred to the quantity of crude acrylic acid used. During the concentration of the extract, the distilling column was supplied with an aqueous solution of 0.025 gram methylene Blue stabilizer per hour. Waste water comprising 92.1% by weight water, 7.3% by weight ethyl acetate, 0.2% by weight acetic acid, 0.3% by weight formaldehyde plus traces of acrylic acid and stabilizer accumulated in the pulsation column base portion. To isolate the ethyl acetate, the waste water was introduced into a stripping column in which the ethyl acetate, which formed an azeotropic mixture with water, was distilled off at 100° C. and atmospheric pressure, the head temperature being 71° C. Once the azeotrope had been separated into its phases, the recovered ethyl acetate was supplied once again to the pulsation column. 105 kg. solvent-free waste water, containing 0.23% by weight acetic acid, 0.33% by weight formaldehyde and 0.03% by weight acrylic acid, were removed from the stripping column base portion. The waste water was found to contain 98% of the acetic acid initially contained in the aqueous crude acid and the formaldehyde content of the waste water was found to correspond to the initial formaldehyde content of the crude acid.

EXAMPLE 2

561 grams per hour of aqueous crude acid, which had been stabilized with methylene Blue and contained 10.1% by weight acrylic acid and 2.1% by weight acetic acid, were supplied to the 30th perforated tray of the pulsating perforated tray column in a 16 hour-test. The crude acid was extracted by supplying 710 grams ethyl acetate per hour to the column base portion and 1250 grams water to the column head portion. The resulting organic extract was worked-up in the manner described in Example 1. Acrylic acid of 99.7% by weight was obtained in a yield of 896 grams or 98.5%, referred to the crude oil acrylic acid and used. The purified acrylic acid found to contain 0.15% by weight acetic acid, 25.05 kg. of solvent-free waste water, containing 0.75% by weight acetic acid, corresponding to 99% of the acetic acid originally contained in the crude acid, were removed from the stripping column base portion.

EXAMPLE 3

145 grams per hour of aqueous crude acid stabilized with methylene Blue and contained 39.5% by weight acrylic acid and 8% by weight acetic acid, was supplied a 24 hour-test to the 30th perforated tray of the pulsating perforated tray column in a 24 hour test. The acrylic acid was extracted by supplying 720 grams ethyl acetate per hour to the column base portion and 1250 grams water to the column head portion and the resulting acrylic acid-containing extract was concentrated in a manner analogous to that described in Example 1. There was obtained 1363 grams of 99.8% acrylic acid, corresponding to a yield of 99%, referred to the crude acrylic acid used. The purified acrylic acid was found to contain less than 0.1% by weight acetic acid. 32 kg. solvent-free waste water were obtained. The waste water was found to contain 277 grams acetic acid, corresponding to 99% of the acetic acid originally contained in the crude acid.

We claim:

1. In a process for isolating pure acrylic acid from the corresponding aqueous crude acid containing acetic acid and formaldehyde, by extracting with ethyl acetate, washing the resulting organic extract with water, and separating out the pure acrylic acid and a low boiling ethyl acetate/water azeotrope from the washed organic extract by distillation; the improvement comprising extracting the crude acid with about 10–15 parts by weight ethyl acetate per part by weight of acrylic acid, and simultaneously washing the resulting organic extract with about 15–25 parts by weight water per part by weight of acrylic acid.

2. The process of claim 1, wherein the extraction of the crude acid by means of ethyl acetate and the washing of the organic extract by means of water are carried out in countercurrent fashion.

3. The process of claim 1, wherein the aqueous, acrylic acid-containing crude acid is extracted by means of 11 to 13 parts by weight ethyl acetate, per part by weight acrylic acid, and the extract is washed out by means of 19 to 23 parts by weight water, per part by weight acrylic acid.

4. The process of claim 1, wherein the countercurrent extraction of the crude acid by means of ethyl acetate is carried out in a pulsation column.

5. The process of claim 1, wherein the washed extract is stabilized by means of methylene Blue before distilling it.

6. The process of claim 1, wherein dissolved ethyl acetate is isolated by distilaltion from the aqueous phase obtained on extracting the crude acid, and the isolated ethyl acetate is recycled to the extraction column.

7. The process of claim 1, wherein the aqueous crude acid contains between about 10 and 40% by weight acrylic acid, between about 1 and 8% by weight acetic acid and between about 1 and 5% by weight formaldehyde.

References Cited

UNITED STATES PATENTS

| 2,726,258 | 12/1955 | Stehman | 203—8 |
| 3,116,980 | 1/1964 | Grimmett | 23—267P |
| 3,226,092 | 12/1965 | Graham et al. | 23—267P |
| 3,337,740 | 8/1967 | Gray et al. | 260—526U |
| 3,344,178 | 9/1967 | Brown et al. | 203—60 |

FOREIGN PATENTS

| 997,324 | 7/1965 | Great Britain | 260—526 |
| 997,325 | 7/1965 | Great Britain | 260—526 |
| 1,405,764 | 5/1965 | France | 260—526 |

WILBUR L. BASCOMB, Jr., Primary Examiner

U.S. Cl. X.R.

203—8, 60, 95